(12) United States Patent
Makela

(10) Patent No.: US 8,924,143 B2
(45) Date of Patent: Dec. 30, 2014

(54) METHOD AND APPARATUS FOR ARRANGING MINING VEHICLE POSITIONING

(75) Inventor: Hannu Makela, Helsinki (FI)

(73) Assignee: Sandvik Mining and Construction Oy, Tampere (FI)

( * ) Notice: Subject to any disclaimer, the term of this patent is extended or adjusted under 35 U.S.C. 154(b) by 224 days.

(21) Appl. No.: 13/696,637

(22) PCT Filed: Apr. 21, 2011

(86) PCT No.: PCT/FI2011/050363
§ 371 (c)(1),
(2), (4) Date: Nov. 7, 2012

(87) PCT Pub. No.: WO2011/141619
PCT Pub. Date: Nov. 17, 2011

(65) Prior Publication Data
US 2013/0060425 A1    Mar. 7, 2013

(30) Foreign Application Priority Data
May 10, 2010 (FI) .................................... 20105506

(51) Int. Cl.
*G01C 21/00* (2006.01)
*G05D 1/02* (2006.01)

(52) U.S. Cl.
CPC .............. *G05D 1/027* (2013.01); *G05D 1/0272* (2013.01); *G05D 1/024* (2013.01); *G05D 2201/021* (2013.01); *G05D 1/0255* (2013.01)
USPC ........................................................ 701/409

(58) Field of Classification Search
CPC ........ G01C 21/20; G01C 21/32; G01C 21/34; G09B 29/10
USPC ........ 701/25, 41, 400, 409, 439, 467; 702/94, 702/95
See application file for complete search history.

(56) References Cited

U.S. PATENT DOCUMENTS

| | | | |
|---|---|---|---|
| 5,999,865 A * | 12/1999 | Bloomquist et al. | ............ 701/25 |
| 2003/0004644 A1 * | 1/2003 | Farmer | ......................... 701/301 |
| 2004/0054434 A1 | 3/2004 | Sturges | |
| 2004/0158355 A1 * | 8/2004 | Holmqvist et al. | ........... 700/245 |
| 2005/0096802 A1 | 5/2005 | Han et al. | |
| 2006/0265166 A1 * | 11/2006 | Makela | ........................... 702/95 |
| 2007/0027612 A1 * | 2/2007 | Barfoot et al. | ................ 701/117 |
| 2008/0208393 A1 | 8/2008 | Schricker | |

FOREIGN PATENT DOCUMENTS

| | | |
|---|---|---|
| EP | 2116121 A1 | 11/2009 |
| WO | 2004085965 A1 | 10/2004 |
| WO | 2007012198 A1 | 2/2007 |

* cited by examiner

*Primary Examiner* — Mary Cheung
(74) *Attorney, Agent, or Firm* — Corinne R. Gorski

(57) ABSTRACT

The present invention relates to a method for positioning a mobile mining vehicle, which method determines scanning data by scanning the environment of the mining vehicle while being driven. Location information is determined for the mining vehicle on the basis of the scanning data and prestored environment model data. Level information is associated with the environment model data, the location level of the mining vehicle (1) is determined and the environment model data to be used are selected on the basis of the determined location level.

18 Claims, 3 Drawing Sheets

METHOD AND APPARATUS FOR ARRANGING MINING VEHICLE POSITIONING

RELATED APPLICATION DATA

This application is a §371 National Stage Application of PCT International Application No. PCT/FI2011/050363 filed Apr. 21, 2011 claiming priority of Finnish Application No. 20105506, filed May 10, 2010.

FIELD OF THE INVENTION

The invention relates to mining vehicle positioning.

BACKGROUND OF THE INVENTION

In mines there are employed various mining vehicles, such as rock drilling rigs, loading machines and transport machines. Mining vehicles may be manned or unmanned. Unmanned mining vehicles may be remote controlled, for instance, from a control room and they may be provided with measuring devices suitable for positioning. Unmanned mining vehicles may be guided in a mine along a desired route provided that the location of the apparatus can be determined. The location of the apparatus may be determined by laser scanners, for instance.

WO 2007/012198 discloses a method for automatic navigation of a mining vehicle. An operator teaches the mining vehicle, either by manually driving or through tele-operation, a route along which the mining vehicle may move without the operator's intervention.

A pre-taught reference model, which is used as a basis for route determination, is required on the tunnels in the operating area of the mining vehicle. This reference model may be called an environment model. The environment model is typically taught by driving the mining vehicle through the required tunnels in the operating area. The environment model of the operating area having been taught, bound to the coordinate system of the operating area and stored in a data system, the mining vehicle is driven, to teach a specific route needed for a driving task, along said route. The navigation system determines the position of the mining vehicle and locations of route points on the traveled route may be determined in relation to the environment model.

BRIEF DESCRIPTION OF THE INVENTION

There is now provided an improved solution relating to the arrangement for mining vehicle positioning. The solution is characterized in what is defined in the independent claims. Some preferred embodiments of the invention are disclosed in the dependent claims.

According to an aspect of the invention, there is provided a method in which level information is associated with environment model data, location level of the mining vehicle is determined and environment model data to be used are selected on the basis of the determined location level. According to a second aspect of the invention, there is provided an apparatus implementing this method and arranged to determine the location level of the mining vehicle and to select the environment model data to be used on the basis of the determined location level.

According to an embodiment of the invention, the mining vehicle is navigated on the basis of location information and pre-stored route point data, in which at least one level data item is associated with at least some of the route point data. The location level is determined in the mining vehicle on the basis of the route point data received for performing a driving task.

The present invention provides several advantages that will be better revealed in the detailed description. The present invention enables the use of at least partly superposed areas in the vertical direction in automated mining vehicle control. The mining vehicle may be arranged to automatically detect the change of location level and, when necessary, to change the location level and environment model data associated with the location level.

BRIEF DESCRIPTION OF THE DRAWINGS

In the following, some embodiments of the invention will be described in greater detail in connection with some preferred embodiments, with reference to the attached drawings, in which.

DETAILED DESCRIPTION OF AN EMBODIMENT OF THE INVENTION

The solution of the invention is applicable, in particular, to security systems relating to mobile mining apparatuses required in mining industry, such as various mobile rock drilling, loading and transport machines. In the following, mobile mining apparatuses of this kind are referred to as mining vehicles. The application field of the invention is not limited to the positioning system of a mining vehicle illustrated in the following, but features of the invention may also be applied to positioning systems of mining vehicles of other types. It should also be noted that, in general, a mining vehicle may also refer to various machines used for rock excavation in a surface or underground operating area, i.e. the mining automation system may be located, at least partly, also somewhere other than in actual underground mines.

Figure 1:
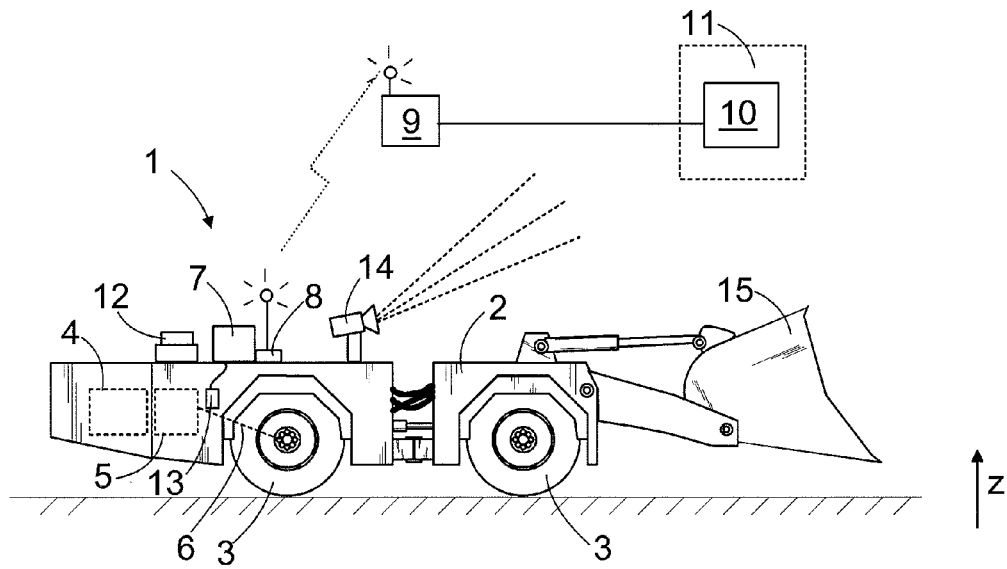
FIG. 1 is a schematic side view of a mobile mining apparatus.

FIG. 1 shows a mining vehicle 1, in this case a loading machine, whose front part comprises a bucket 15 for transporting and loading excavated material. Alternatively, the mining vehicle 1 may be, for instance, a rock drilling rig or a transport apparatus provided with a box. The mining vehicle 1 comprises a movable carrier 2 with several wheels 3, at least one of which is a drive wheel driven by a motor 4 through power transmission. The motor 4 may be an electric motor, an internal combustion engine, a hydraulic motor or any other device for providing rotation torque. The power transmission usually includes a gear system 5 and necessary propeller shafts 6, differential gear and other power transmission elements for transmitting the rotation torque from the motor 4 to the drive wheels. Unlike in the example of FIG. 1, the mining vehicle could alternatively be track-driven. In addition, the mining vehicle 1 is provided with a control system which includes at least a first control system 7 that is arranged to control actuators of the mining apparatus 1 for steering and operating the vehicle.

Further, the mining vehicle 1 may include a data transfer unit 8, by means of which the first control system 7 may establish a data transfer connection with a second control system 10 outside the mining vehicle 1 by utilizing a wireless connection provided by a base station 9. The second control system 10 may be located in a control room 11 that may be arranged outside the mine. The control systems 7 and 10 may be computers furnished with appropriate software.

FIG. 1 is simplified, and the control system of the mining vehicle 1 typically comprises a plurality of units for implementing various control functions. The control system of the mining vehicle 1 may be a distributed one, for instance a whole consisting of modules connected to a CAN (Controller Area Network) bus and taking care of measurings and controls of the machine. The data system of the control room 11 may also comprise one or more servers, databases, operator work stations and a connection to other networks and systems.

The control system of the mining vehicle 1 comprises a positioning system or unit. According to one embodiment the positioning system comprises at least one gyroscope 12 by which it is possible to determine the direction of the mining vehicle precisely for positioning. The positioning system further includes means for determining the distance traveled by the mining vehicle 1. For instance, one or more sensors 13 may measure the rotation of a wheel. On the basis of the measurement data the positioning system determines the rotational motion of the wheel and then calculates the distance traveled by the mining vehicle 1. Further, the positioning system may include one or more scanners 14, for instance a laser scanner or the like, by which it is possible to determine the space surrounding the mining vehicle 1 and the shapes thereof.

Figure 2:
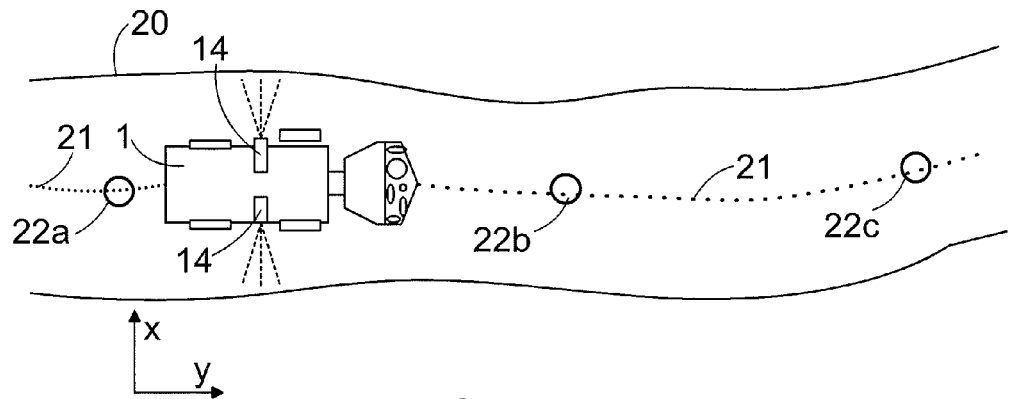
FIG. 2 is a top view of an arrangement for positioning and navigating a mining vehicle in accordance with an embodiment.

FIG. 2 illustrates the principle of route determination based on scanning and employed in positioning in accordance with an embodiment, and the use thereof. One or both sides of the mining vehicle 1 may comprise laser scanners 14, by which the profile and surface contours of a mine passage 20 may be determined. The scanners 14 may be laser scanners, ultrasound scanners or the like, by which the space surrounding the mining vehicle may be observed.

A driving route 21 for the mining vehicle 1 may be created by teaching. In that case the mining vehicle 1 is driven in manual control along a desired path and on the basis of the location data obtained by scanning data processing, route points 22a, 22b, 22c for the route 21 are determined and stored in memory at predetermined intervals.

The desired route 21 having been taught and stored in the memory of the control system, the mining vehicle 1 may be controlled to navigate the route 21 autonomously. During the automatic control the location of the mining vehicle 1 may be determined by using laser scanners 14, for instance. On the basis of scanning data and the wall location data determined by a pre-stored environment model it is possible to determine the mining vehicle's 1 current location, and no separate identifiers, such as reflectors or radio frequency identifiers, are needed on tunnel walls. Determination of the location data may be implemented, for instance, by carrying out dead-reckoning and correcting the results of dead-reckoning on the basis of the scanning data and the environment model data so as to determine the (final) location information. The control system controls the travel of the mining vehicle on the basis of the determined location and the route points of the driving route such that the mining vehicle 1 follows the route 21.

FIG. 2 illustrates the operating area of the mining vehicle 1, seen from above the mining vehicle 1, where route points 22a to 22c of the driving route are determined two-dimensionally on coordinate axes x and y. Typically, in the mining environment there is not available any general-purpose, reliable measuring for a height coordinate, and therefore both in the environment model data and in the driving route data the coordinates are determined in two dimensions. In many cases, however, production areas consist of several, partly or completely superposed areas, in which case two-dimensional location information is not unambiguous.

There is now provided a solution that enables determination and use of vertically superposed driving routes. At least in some of the environment model data there is associated level information that generally associates the whole environment model, or one or more environment model points or portions, with a given level, typically with a level relating to a certain height position (z). When the mining vehicle 1 is driving a predefined route, the mining vehicle's 1 current location level, i.e. the level of the current driving situation will be determined. The environment model data to be used are selected on the basis of the location level determined for the mining vehicle, i.e. there is selected an environment model or a specific environment model portion, the level associated therewith corresponding (with sufficient accuracy) to the mining vehicle's 1 current location level. The mining vehicle 1 is arranged to determine the location level during driving, for instance, at given points on the driving route and, when necessary, to automatically change the environment data to be used. In that case, for instance, when a tunnel divides into two superposed tunnels the mining vehicle 1 may automatically change to use correct environment model points while proceeding into an upper or a lower tunnel.

The environment model generally refers to a model representing the operating area of the mining vehicle, which model may have been determined, for instance, by driving the mining vehicle within the operating area and scanning wall profiles. Scanning is to be understood here in a broad sense to cover data definition of any kind on the mining vehicle's current surroundings. Typically, the environment model comprises location data on at least the edges of the operating area, such as the points defining tunnel walls, but it may also comprise other data. The driving route generally refers to data on the basis of which the mining vehicle 1 may be controlled to travel a desired route.

Figure 3:
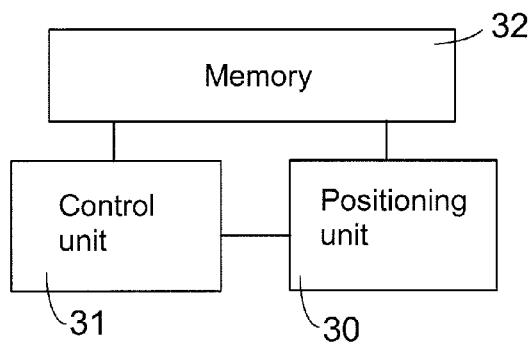
FIG. 3 illustrates the apparatus of an embodiment for determining driving routes for a mining vehicle.

FIG. 3 illustrates, in a simplified form, an apparatus of an embodiment for controlling a mining vehicle, for instance, for a control system 7 of the mining vehicle 1 of FIG. 1. The apparatus comprises a positioning unit 30, a control unit 31 and a memory 32.

The positioning unit 30 takes care of determining the mining vehicle's current location on the basis of measurement data received from scanners 15 and environment model data pre-stored in the memory 32. On the basis of the location data provided by the positioning unit 30 and the driving route data prestored in the memory 32 and/or received during driving the control unit 31 controls the mining vehicle to travel along the determined route.

The positioning unit 30 may be particularly arranged to determine the location level and, when necessary, to change the environment model data used for positioning on the basis of the location level.

Units 30, 31 may be implemented, for instance, by one or more general-purpose data processing processor, in which one or more computer programs are executed. The computer program comprises code for implementing at least some of the features associated with determination and/or utilization of a location level and illustrated in connection with FIGS. 4 to 6. The computer program may be stored on a computer-readable storage medium, such as memory 32 or a separate storage medium, wherefrom the computer program may be retrieved for execution in the processor. In addition to the computer program implementation, or in place thereof, at least part of the present functionality may be carried out as hardware implementation, for instance by using ASICs (Application Specific Integrated Circuit).

The apparatus may also comprise one or more other interfaces to other systems or units. The apparatus is typically connected to a data transfer unit 8, through which it is possible to transmit driving route data or other control data to the mining vehicle 1. It should be noted that the apparatus of FIG. 3 is just one example of a possible implementation and the present functionality disclosed in greater detail in the following may also be implemented in an apparatus of another type. For instance, one unit may take care of the functions of both the positioning unit 30 and the control unit 31, or the apparatus may comprise a plurality of units into which the present functionality is distributed. It should also be noted that the apparatus may comprise several, separate memories, for instance, different memories for the units 30, 31.

Figure 4:
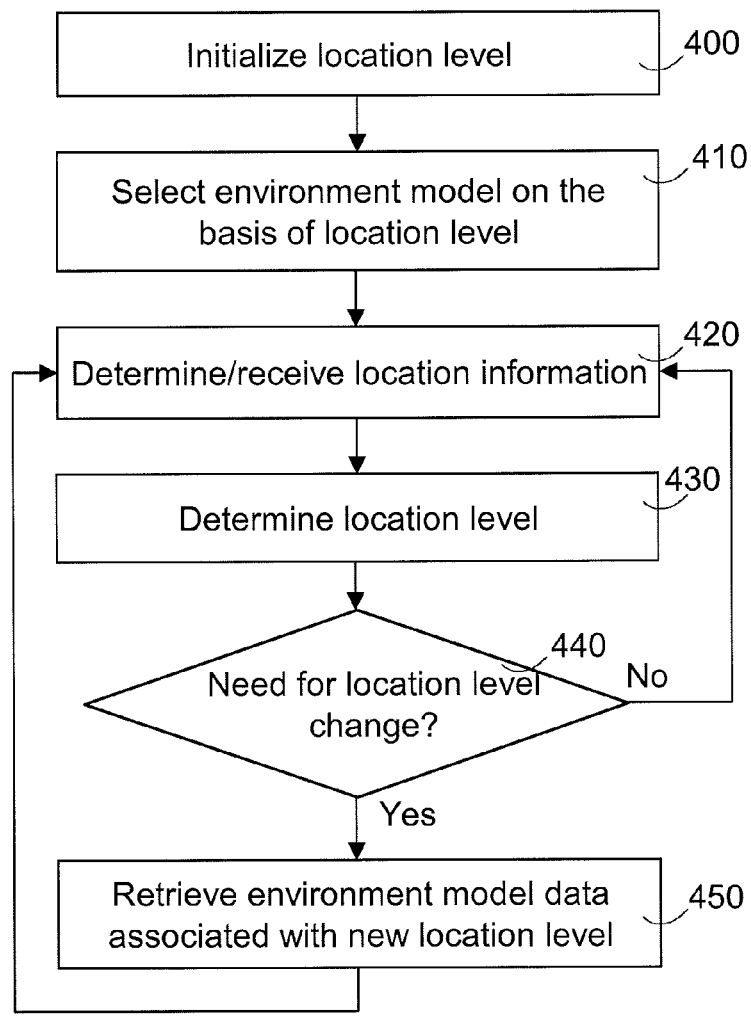
FIGS. 4 to 6 illustrate methods in accordance with some embodiments.

FIG. 4 shows a method according to an embodiment, which may be implemented in the positioning unit 30 illustrated in FIG. 3, for instance.

In step 400 a location level is initialized. It is possible to enter to step 400, for instance, at the beginning of a driving task and the mining vehicle is locating at the starting place of the driving task, and the initial location level is determined in step 400. The location level may be initialized simultaneously with the initialization of the starting place (absolute or relative location). The initialization of the location level may be performed on the basis of the input data received from the user or on the basis of the control data, such as driving route data defining the driving task. If the user initializes a wrong level, reliability of the location is not likely to be sufficient, because the scanner measurements included in the positioning do not correspond to the environment model of the chosen level.

In step 410 environment model point data associated with the initialized location level are selected and retrieved for use during driving of the mining vehicle 1. Thus, in that case it is possible to select an environment model to be used in at least part of the driving task. The positioning unit 30 may retrieve from the memory 32, for instance, a specific environment model file that is associated with the determined location level. Naturally, the mining vehicle's 1 current location may affect the environment model data to be retrieved in step 410.

The relative or absolute location of the mining vehicle 1 is determined on a continuous basis during driving on the basis of the measurement data received from the scanners and the environment model data retrieved in step 420 (410?). In step 420 is determined the mining vehicle's 1 current location. Alternatively, if the algorithm illustrated in FIG. 4 is implemented separately from the functionality determining the location data, in step 420 it is possible to receive the location data determined for the mining vehicle 1.

In step 430 is determined the location level associated with the mining vehicle's 1 current driving situation. The location level may be determined on the basis of the mining vehicle's 1 current location and/or another check made in the current driving situation. It is possible to proceed to step 430, for instance, at given intervals or on the basis of some other criteria, such as when a driving segment is changing.

In step 440 it is checked, on the basis of the determined location level, whether it is necessary to change the location level (initialized in step 400). In that case it is possible to compare the determined location level with the level or levels associated with the environment model in use. If there is no need to change the location level, on the basis of the check made in step 440, it is possible to return to step 420. If the location level is changed such that the environment models now in use are not associated with the new location level, new environment model data are selected on the basis of the location level. In that case, in step 450, it is possible to retrieve/determine environment model point data associated with the new location level for use in location definition (420). For instance, if there are different files for different levels, in step 450 it is possible to retrieve the environment model file to be used in location determination associated with the location level determined for the mining vehicle.

The points in the environment model may thus be divided level-wise in at least part of the operating area. In accordance with an embodiment, the points belonging to different levels in the environment model are located at joints, for instance, where the tunnel divides into branches of different height positions, at least partly on top of each other or at least close to each other. In other words, the same x and y coordinates, or at least those in close proximity, may determine several environment model points associated with different levels. In that case it is possible to improve the operational reliability of the positioning in connection with a level change and to enable the measurements performed by a plurality of scanners 14, prior to the level change or immediately thereafter, to fall within the area of the level in use.

In accordance with an embodiment, in addition to the x and y coordinates of points representing the location of walls, the environment model determines z coordinates determined with suitable accuracy and employable as level data. The z coordinates may be determined in the environment model at least in the parts, where at least partly superposed operating areas (e.g. mining tunnels) exist. The z coordinates may be determined for each point separately or for a set of points. It should be noted, however, that the location level may be determined in the environment model (and possibly also in the driving route data) in a variety of ways, for instance, the location levels may be determined by using any identifiers for each at least partly superposed area of the operating area.

In accordance with an embodiment, at least one level data item is associated with at least some of the driving route data used in the control of the mining vehicle 1. In step 400 and/or step 430, it is possible to determine a location level in the mining vehicle 1 on the basis of driving route point data received for carrying out a driving task. The location level may be determined in the driving route data in a variety of ways, for instance, by associating the location level data with a set of driving route points relating to said level, or even with each driving route point separately.

In accordance with an embodiment, the driving routes are determined as interconnected route portions, i.e. segments each having a dedicated identifier code. For each segment, in turn, it is possible to define, if so desired, limit values for driving speeds and other functions according to the segment characteristics. The segment-specific data may be stored in advance in the memory of the control apparatus of the mining vehicle 1, whereby the determination of a driving task, at its simplest, may take place by sending to the mining vehicle 1 just a list on identifier codes of route segments involved in the task. Segment-based route determination is described in greater detail in publication WO2004/085965, which is incorporated herein as reference.

In segment-specific data, the level information may now be determined as new information. In step 430, the mining vehicle 1 may define the location level by checking the level data of the segment relating to the mining vehicle's current location. Knowing the level to which each segment belongs, and on the other hand, knowing the segment in which driving takes place at each particular time instant it is possible to determine the location level of the mining vehicle 1 at that time on the basis of this information. In that case the positioning unit 30 may determine the location level on the basis of the data received from the control unit 31. The location level may be determined each time a segment is changing.

In accordance with an embodiment, the location level is determined in step 430 on the basis of the identification information received from a separate identification unit placed in the operation area of the mining vehicle 1 or a detector placed in the mining vehicle 1. In the operating areas, for instance, in connection with intersections, there may be mounted identification units with identifiers the mining vehicle is arranged to read by using a short-range radio connection.

In accordance with yet another embodiment, location data that may indicate at least a starting and/or ending point of the location level are associated with the location levels. The level information may thus be linked to a particular location and the location level may be determined in step 430, and the changing of the location level may only be detected on the basis of the location of the mining vehicle determined in step 420. In step 430, 440 it is thus possible to determine the location level on the basis of the comparison of the location data associated with various location levels and the (latest) location information of the mining vehicle.

When the mining vehicle's current location corresponds, with sufficient accuracy, to the location associated with a new location level, in step 450 the positioning unit 30 may change the location level and retrieve the environment model associated with the new location level. This embodiment enables an appropriately functioning level change also in situations where the mining vehicle control does not employ driving route data including level data. For instance, in remote-control drive the mining vehicle 1 is not given any route segments, but the mining vehicle knows its own coordinates alone.

Figure 5:
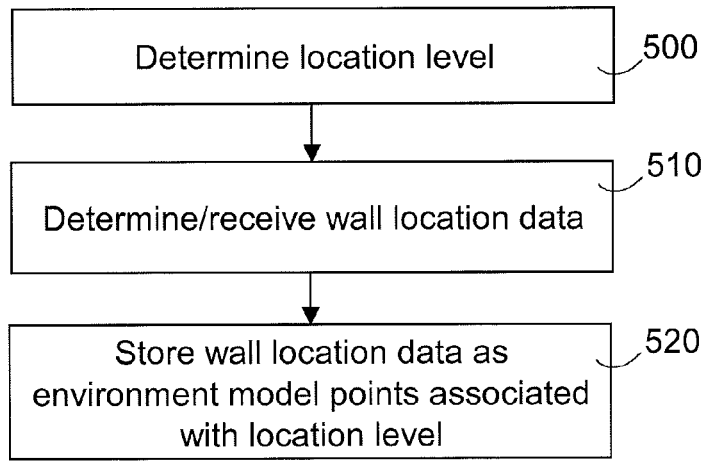

The above illustrates the use of an environment model comprising level-specific data for positioning a mining vehicle 1. The environment model of this kind may be taught by driving the mining vehicle 1. FIG. 5 illustrates, in a simplified form, how to determine an environment model comprising location level data. Steps of FIG. 5 may be implemented, for instance, by an environment modelling unit or tool, which is in an operational connection with the positioning system of the mining vehicle.

When a need arises to determine an environment model, there is first determined a location level for which the environment model (or first points thereof) will be determined. In step 500, it is also possible to determine the starting point of the environment model and thus the starting coordinates of the environment model. This starting point may be used as a reference point in the determination of the environment model and optionally also in the determination of the driving route. One starts driving the mining vehicle 1 from the starting area towards a teaching termination area of the environment model.

In step 510, wall location data are determined or received, for instance, on the basis of data received from scanners 14, the traveled distance and direction. Measurement data received from the scanners of the mining vehicle 1 are filtered and processed, and wall location data are determined during driving on the basis of the distance measurement.

Wall location data are stored in step 520 associated (directly or indirectly) with the location level set in step 500. It should be noted that during the determination of the environment model it is also possible to change a location level, so the method may return to step 500.

In accordance with an embodiment, when a driving route is being taught, one or more location level data items are associated with at least some of the driving route data. This location level data item may be obtained, for instance, from the location level information of the environment model used during the teaching of the driving route or on the basis of an input by the user.

Figure 6:
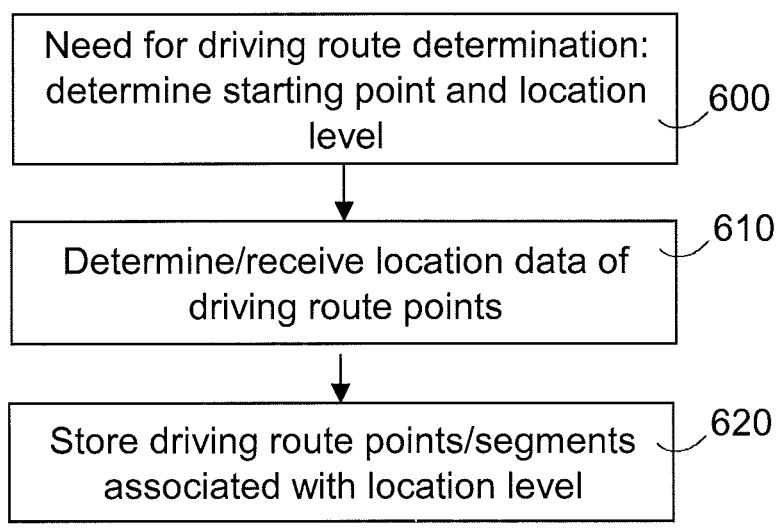

FIG. 6 illustrates, in a simplified manner, the principal steps of determining location level data of the driving route. Steps of FIG. 6 may be implemented, for instance, by a route determination unit, which communicates operationally with the positioning system of the mining vehicle. In step 600 there is first initialized the starting point of the driving route, i.e. the location and the location level of the starting point.

In step 610 are determined route point data of the driving route by using an appropriate environment model. If the location data of the route points are determined by some other unit than the unit implementing the functionality of FIG. 6, in step 610 it is possible to receive driving route point data. Route points of the driving route may be determined by driving the mining vehicle 1 along the desired route, whereby location data are determined on the basis of the scanning data and the environment model.

Route point data determined for the driving route are stored in step 620 associated with the dedicated current location of the driving route. At least some of the driving route point data stored in step 620 are (directly or indirectly) associated with the location level, for instance segment-specifically. The driving route data may be stored on any memory media 32, for instance, in the database of the mine control system. It should be noted that during the determination of the driving route it is also possible to change the location level, so the method may return to step 600.

In accordance with an embodiment, the environment model and/or the driving route data comprising level information is stored in an XML (extensible markup language) based file. It should be noted, however, that application of the present embodiments is not restricted to any particular storage format.

It is obvious to a person skilled in the art that as technology advances, the basic idea of the invention may be implemented in a variety of ways. Thus, the invention and the embodiments thereof are not restricted to the above-described examples, but they may vary within the scope of the claims. Various features may thus be omitted, modified or replaced by equivalents, and the features set forth in this application may be combined to provide various combinations.

The invention claimed is:

1. A method for positioning a mobile mining vehicle, wherein scanning data is determined by scanning an environment of the mining vehicle while the mining vehicle is driven, comprising the steps of:
   determining location information for the mining vehicle with a positioning unit on the basis of the scanning data and pre-stored environment model data including location data of at least edges of an operating area, wherein level information is associated with at least some of the environment model data;
   determining a location level of the mining vehicle from the positioning unit;
   selecting environment model data from the positioning unit to be used on the basis of the determined location level; and
   retrieving, in response to a change of location level during driving, environment model data associated with a new location level for use in the determination of the location information.

2. The method of claim 1, wherein the location level is initialized at a starting point of a driving event of the mining vehicle and environment model data associated with the initialized location level is retrieved for use during the driving of the mining vehicle.

3. The method of claim 1, wherein the mining vehicle is steered on the basis of the location data and pre-stored driving route point data, wherein at least one level data item is associated with at least some of the driving route point data, and the location level is determined in the mining vehicle on the basis of the driving route point data received from performing a driving task.

4. The method of claim 3, wherein the driving route is determined as a set of segments, each of which is associated with level information, and the location level is determined on the basis of the level data of a segment relating to the mining vehicle's current location.

5. The method of claim 1, wherein the location level is determined based on identification information received in the operating area of the mining vehicle.

6. The method of claim 1, wherein the environment model data is determined from wall location data determined from the driving of the mining vehicle and the set location level.

7. The method of claim 1, wherein the location level is determined from information obtained from a detector placed on the mining vehicle.

8. The method of claim 1, wherein the location level is determined from the comparison of the location data associated with the level information and the location data of the mining vehicle.

9. The method of claim 1, further comprising the step of providing a computer program including computer program coding means that are arranged to carry out the steps of the method when said program is executed on a computer.

10. An apparatus, comprising at least one data processing device for positioning a mobile mining vehicle, wherein the apparatus is arranged to determine location information of the mining vehicle from a positioning unit on the basis of scanning data obtained by scanning the environment of the mining vehicle and pre-stored environment model data comprising location data on at least the edges of an operating area, such that level information is associated with at least some of the environment model data and that the apparatus is also arranged to determine a location level of the mining vehicle by the positioning unit to select with the positioning unit environment model data to be used on the basis of the location level, and to retrieve, in response to a change of location level during driving, environment model point data associated with a new location level for use in determination of the location information.

11. The apparatus of claim 10, wherein the apparatus is arranged to initialize the location level at the starting point of a driving event of the mining vehicle and the apparatus is arranged to retrieve environment model point data associated with the initialized location level for use during driving of the mining vehicle.

12. The apparatus of claim 10, wherein the mining vehicle is arranged to be steered on the basis of the location data and pre-stored driving route point data, wherein at least one level data item is associated with at least some of the driving route point data and the apparatus is arranged to determine the location level in the mining vehicle on the basis of the driving route point data received for performing a driving task.

13. The apparatus of claim 12, wherein the driving route is determined as a set of segments, wherein level information is associated with each of the segments, and the apparatus is arranged to determine the location level on the basis of the level information of a segment relating to the mining vehicle's current location.

14. The apparatus of claim 10, wherein the apparatus is arranged to determine the location level on the basis of identification information received in the operating area of the mining vehicle.

15. The apparatus of claim 10, wherein the apparatus is arranged to determine the environment model data from wall location data determined from the driving of the mining vehicle and the set location level.

16. The apparatus of claim 10, wherein the apparatus is arranged to determine the location level from information obtained from a detector placed on the mining vehicle.

17. The apparatus of claim 10, wherein the apparatus is arranged to determine the location level from location data associated with the level data and the location information of the mining vehicle.

18. The apparatus of claim 10, wherein the apparatus is part of a mining machine.

* * * * *